(12) United States Patent
Saylor et al.

(10) Patent No.: US 11,981,178 B1
(45) Date of Patent: May 14, 2024

(54) VEHICLE STABILIZER BAR

(71) Applicant: GM GLOBAL TECHNOLOGY OPERATIONS LLC, Detroit, MI (US)

(72) Inventors: Brian K. Saylor, South Lyon, MI (US); Robert Patrick Marble, White Lake, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/319,780

(22) Filed: May 18, 2023

(51) Int. Cl.
*B60G 21/055* (2006.01)

(52) U.S. Cl.
CPC .... *B60G 21/0558* (2013.01); *B60G 2202/132* (2013.01); *B60G 2202/24* (2013.01); *B60G 2204/62* (2013.01); *B60G 2206/41* (2013.01); *B60G 2206/427* (2013.01); *B60G 2400/104* (2013.01); *B60G 2400/204* (2013.01); *B60G 2400/252* (2013.01); *B60G 2500/104* (2013.01); *B60G 2500/20* (2013.01); *B60G 2600/182* (2013.01); *B60G 2800/012* (2013.01); *B60G 2800/9122* (2013.01)

(58) Field of Classification Search
CPC .......... B60G 21/0558; B60G 2202/132; B60G 2202/24; B60G 2204/62; B60G 2206/41; B60G 2206/427; B60G 2400/104; B60G 2400/204; B60G 2400/252; B60G 2500/104; B60G 2500/20; B60G 2600/182; B60G 2800/012; B60G 2800/9122

USPC .................................... 280/124.149, 124.152
See application file for complete search history.

(56) References Cited

U.S. PATENT DOCUMENTS

| | | | |
|---|---|---|---|
| 2005/0087410 A1* | 4/2005 | Namuduri | F16F 9/535 |
| | | | 188/267.2 |
| 2017/0089408 A1* | 3/2017 | Berthelemy | H02K 5/02 |
| 2021/0138645 A1* | 5/2021 | Larose | B25J 9/1664 |
| 2021/0270343 A1* | 9/2021 | Battlogg | F16F 9/145 |

FOREIGN PATENT DOCUMENTS

WO    WO-2015113564 A1 *  8/2015  ............. F16D 13/52

* cited by examiner

*Primary Examiner* — Toan C To

(57) ABSTRACT

A stabilizer bar assembly for a suspension system of a vehicle. The stabilizer bar assembly includes a first bar configured to be coupled to the vehicle suspension system proximate to a first wheel. A second bar is adjacent to the first bar. A coupling assembly is at an interface between the first bar and the second bar. The coupling assembly includes a magnetorheological material in contact with both the first bar and the second bar. The magnetorheological material is configured to transform from a fluid state to a viscoelastic solid state when subject to a magnetic field. A magnet is configured to apply the magnetic field to the magnetorheological material. In the viscoelastic solid state, the magnetorheological material resists relative movement between the first bar and the second bar.

20 Claims, 5 Drawing Sheets

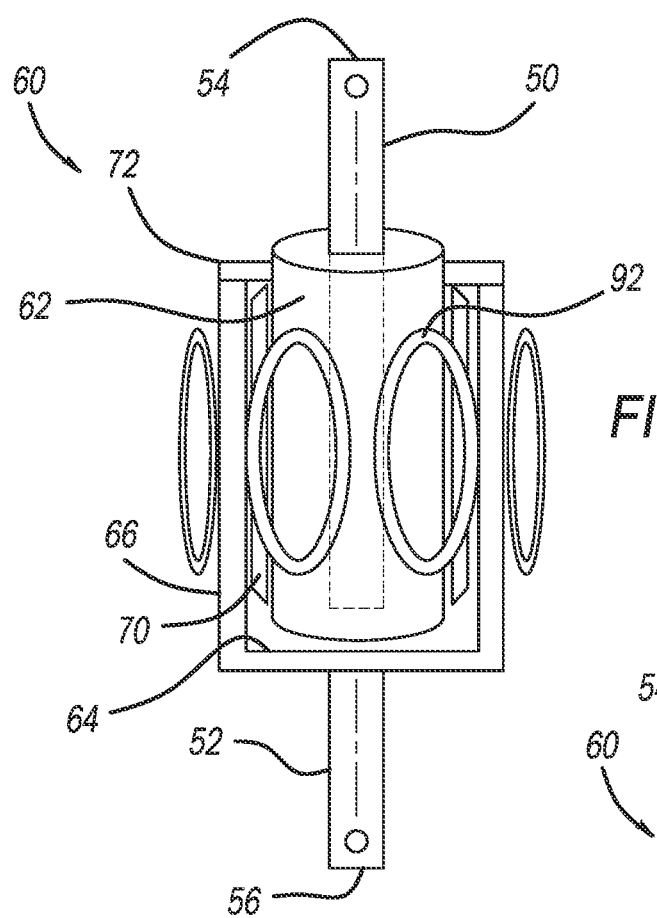
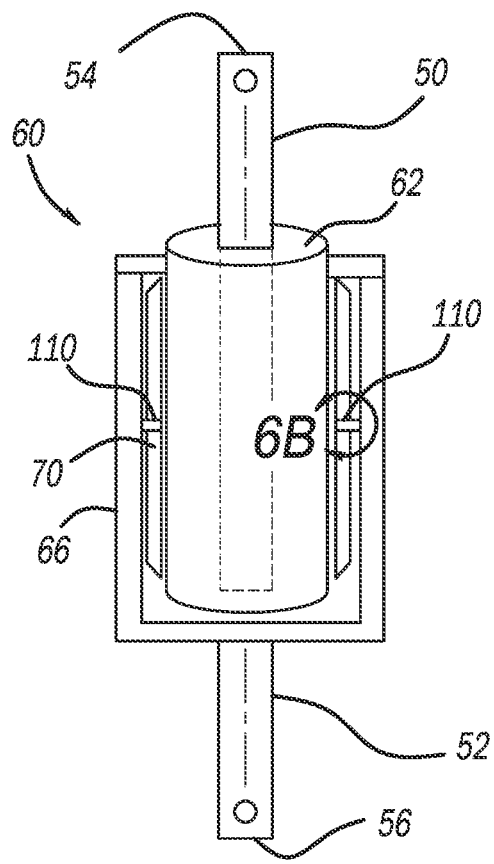
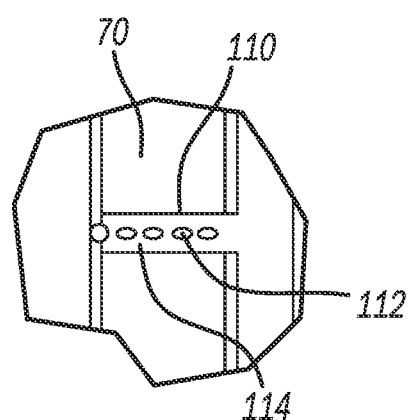
FIG. 5
FIG. 6B
FIG. 6A

VEHICLE STABILIZER BAR

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to stabilizer bars for vehicles.

A vehicle suspension system may include one or more stabilizer bars to reduce body roll and sway. A stabilizer bar generally connects opposite wheels together, such as by attaching to opposing struts or control arms, for example. Under some conditions, it may be desirable to disconnect the stabilizer bar, such as to soften the suspension and enhance off-road performance.

SUMMARY

In various features, the present disclosure includes a stabilizer bar assembly for a suspension system of a vehicle. The stabilizer bar assembly includes a first bar configured to be coupled to the vehicle suspension system proximate to a first wheel. A second bar is adjacent to the first bar. A coupling assembly is at an interface between the first bar and the second bar. The coupling assembly includes a magnetorheological material in contact with both the first bar and the second bar. The magnetorheological material is configured to transform from a fluid state to a viscoelastic solid state when subject to a magnetic field. A magnet is configured to apply the magnetic field to the magnetorheological material. In the viscoelastic solid state, the magnetorheological material resists relative movement between the first bar and the second bar.

In further features, the magnetorheological material is sealed within a chamber of the coupling assembly defined between the first bar and the second bar.

In further features, the first bar includes a cylinder, and the second bar defines a receptacle in which the cylinder is seated; and the magnetorheological material is between the cylinder and an inner wall of the receptacle.

In further features, the magnet is a field magnet.

In further features, the magnet is a damper restriction magnet.

In further features, the magnet is adjacent a passageway defined by the coupling assembly. The magnetorheological material is seated within the passageway.

In further features, the second bar is configured to be coupled to the vehicle suspension system proximate to a second wheel that is opposite to the first wheel.

In further features, the coupling assembly is a first coupling assembly proximate to the first wheel on a first side of the vehicle; and a second coupling assembly is proximate to a second wheel on a second side of the vehicle, the second coupling assembly is a magnetorheological fluid coupling assembly configured to resist relative movement between the second bar and a third bar, the third bar configured to be coupled to the vehicle suspension system proximate to the second wheel.

In further features, the magnet includes: a first coaxial magnet overlapping a distal end of the first bar and overlapping a sleeve of the second bar; a second coaxial magnet overlapping a distal end of the sleeve of the second bar and overlapping the first bar; and a third coaxial magnet overlapping both the first bar and the sleeve of the second bar, the third coaxial magnet is between the first coaxial magnet and the second coaxial magnet.

In further features, a control module is configured to individually activate the first coaxial magnet, the second coaxial magnet, and the third coaxial magnet.

In further features, a control module is configured to not change an energy state of the magnet when speed of the vehicle is above a predetermined limit.

In further features, the control module is further configured to not change an energy state of the magnet when the vehicle is experiencing a lateral gravitational force that is above a predetermined G-force threshold, and when relative vertical displacement between the first wheel and a second wheel opposite to the first wheel exceeds a predetermined displacement threshold.

In further features, a control module is configured to gradually energize the magnet to gradually apply the magnetic field to the magnetorheological material when speed of the vehicle exceeds a predetermined threshold.

In further features, a control module is configured to monitor a displacement of the first wheel and a second wheel opposite to the first wheel, and reduce the magnetic field of the magnet to decrease viscosity of the magnetorheological material and permit relative movement between the first bar and the second bar in response to the displacement exceeding a predetermined level during an impact event.

The present disclosure includes, in various features, a stabilizer bar assembly for a suspension system of a vehicle, the stabilizer bar assembly including: a first bar including a first end configured to be coupled to the vehicle suspension system proximate to a first wheel on a first side of the vehicle; a second bar defining a sleeve in receipt of a second end of the first bar, the second bar configured to be coupled to the vehicle suspension system proximate to a second wheel opposite to the first wheel on a second side of the vehicle; and a coupling assembly at an interface between the first bar and the second bar. The coupling assembly includes: a magnetorheological material in contact with both the first bar and the second bar, the magnetorheological material configured to transform from a fluid state to a viscoelastic solid state when subject to a magnetic field; and a magnet configured to apply the magnetic field to the magnetorheological material, in the viscoelastic solid state the magnetorheological material resists relative torsional rotation between the first bar and the second bar.

In further features, the magnet includes: a first coaxial magnet overlapping both the second end of the first bar and the sleeve of the second bar; a second coaxial magnet overlapping a distal end of the sleeve of the second bar and overlapping the first bar; and a third coaxial magnet overlapping both the first bar and the sleeve of the second bar, the third coaxial magnet is between the first coaxial magnet and the second coaxial magnet.

In further features, a control module is configured to individually activate the first coaxial magnet, the second coaxial magnet, and the third coaxial magnet to vary torsional stiffness of the stabilizer bar assembly.

In further features, the present disclosure includes a stabilizer bar assembly for a suspension system of a vehicle, the stabilizer bar assembly including: a bar between a first wheel at a first side of the vehicle and a second wheel at a second side of the vehicle, the bar extending from the first side of the vehicle to the second side of the vehicle; and a first coupling assembly mounted adjacent to the first wheel.

The first coupling assembly includes: a sleeve in receipt of the bar; a magnetorheological material within the sleeve and in contact with the bar, the magnetorheological material configured to transform from a fluid state to a viscoelastic solid state when subject to a magnetic field; and a magnet configured to apply the magnetic field to the magnetorheological material, in the viscoelastic solid state the magnetorheological material resists linear movement of the bar relative to the sleeve.

In further features, the bar extends from the first coupling assembly and is mounted proximate to a control arm of the second wheel.

In further features, a second coupling assembly mounted adjacent to the second wheel, the second coupling assembly is a magnetorheological coupling assembly in receipt of the bar.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 5 is a cross-sectional view of another coupling assembly in accordance with the present disclosure;

FIG. 6A is a cross-sectional view of an additional coupling assembly of the present disclosure;

FIG. 6B illustrates area 6B of FIG. 6A; and

In the drawings, reference numbers may be reused to identify similar and/or identical elements.

DETAILED DESCRIPTION

Figure 1:
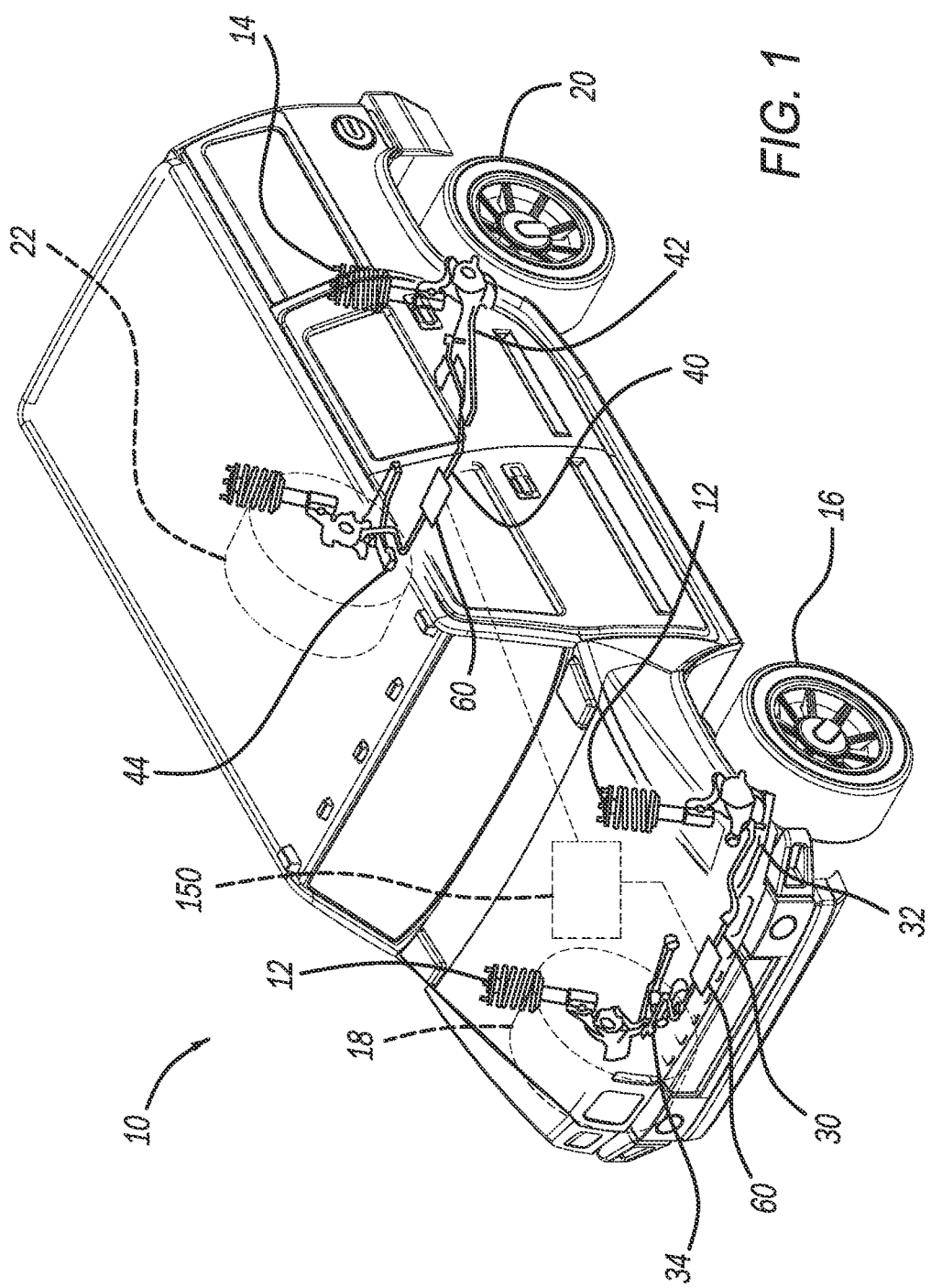
FIG. 1 is a perspective view of an exemplary suspension system of a vehicle including a front stabilizer bar assembly and a rear stabilizer bar assembly in accordance with the present disclosure.

FIG. 1 illustrates an exemplary vehicle 10 including a front suspension system 12 and a rear suspension system 14. The front suspension system 12 is connected to a first front wheel 16 and a second front wheel 18. The rear suspension system 14 is connected to a first rear wheel 20 and a second rear wheel 22. Although the vehicle 10 is generally illustrated as a sport utility vehicle (SUV), the vehicle 10 may be configured as any other suitable vehicle, such as any suitable recreational vehicle, military vehicle, construction vehicle/equipment, etc. The present disclosure is also applicable to any suitable non-vehicular applications.

The front suspension system 12 includes a front stabilizer bar assembly 30, which generally connects a left side of the front suspension system 12 to a right side of the front suspension system 12. More specifically, the front stabilizer bar assembly 30 is connected to a first front control arm 32 of the first front wheel 16, and a second front control arm 34 of the second front wheel 18. Alternatively, the front stabilizer bar assembly 30 may be connected to a knuckle, strut, or any other suitable portion of the front suspension system 12 associated with the first front wheel 16 and the second front wheel 18. The rear suspension system 14 includes a rear stabilizer bar assembly 40, which connects a first rear control arm 42 to a second rear control arm 44. Alternatively, the rear stabilizer bar assembly 40 may be connected to rear knuckles, struts, or any other suitable portions of the rear suspension system 14 associated with the first rear wheel 20 and the second rear wheel 22.

Although the vehicle 10 is illustrated as including both a front stabilizer bar assembly 30 and a rear stabilizer bar assembly 40, the present disclosure applies to vehicles including only one of the front and rear stabilizer bar assemblies 30, 40. The front stabilizer bar assembly 30 and the rear stabilizer bar assembly 40 are substantially similar, and thus only the front stabilizer bar assembly 30 is described in detail herein. The detailed description of the front stabilizer bar assembly 30 also applies to the rear stabilizer bar assembly 40.

Figure 2:
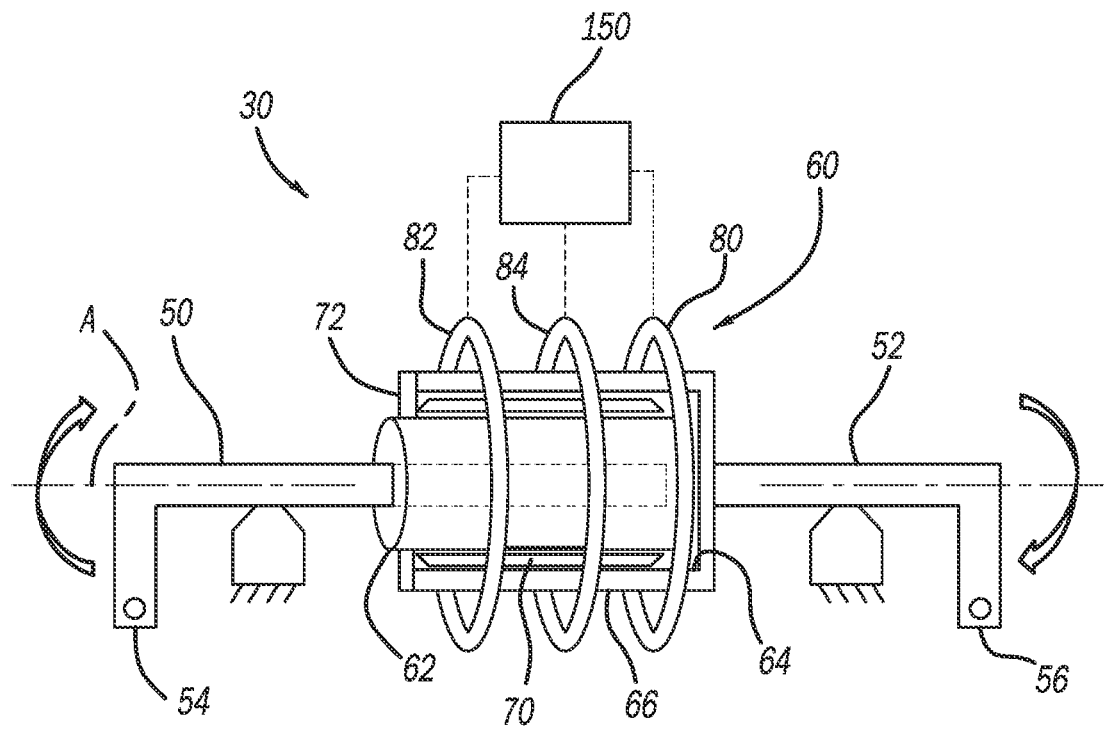
FIG. 2 is a cross-sectional view of one of the stabilizer bar assemblies of FIG. 1.

FIG. 2 illustrates the front stabilizer bar assembly 30 in additional detail. The front stabilizer bar assembly 30 generally includes a first bar or portion 50 and a second bar or portion 52. An outer end 54 of the first bar is configured to be connected to the first control arm 32, the second control arm 34, or any other suitable component of the front suspension system 12, such as the knuckle, strut, etc. An outer end 56 of the second bar 52 is configured to be connected to a side of the front suspension system 12 that is opposite to the side that the outer end 54 of the first bar 50 is connected to. The outer end 56 is thus configured to be connected to the opposite control arm 32, 34, knuckle, strut, etc.

At an interface between the first bar 50 and the second bar 52 is a coupling assembly 60. The coupling assembly 60 includes a cylinder 62 of the first bar 50, and a receptacle 64 defined by a sleeve 66 of the second bar 52. Between the cylinder 62 and an inner wall of the sleeve 66 is a magnetorheological (MR) material 70. The MR material 70 is retained and sealed within the receptacle 64 by a seal 72.

The MR material 70 may include, for example, magnetic particles suspended in a carrier fluid, such as a carrier oil. When subjected to a magnetic field, the MR material increases in viscosity. When the strength of the magnetic field exceeds a threshold based on intrinsic properties of the MR material 70, the MR material 70 transforms from a fluid state to a viscoelastic solid state. When the strength of the magnetic field is reduced to below the threshold, the MR material 70 transforms from the viscoelastic solid state to the fluid state. The MR material 70 fills the receptacle 64 so as to contact both the cylinder 62 and the inner wall of the sleeve 66. When subject to a magnetic field of sufficient strength, the MR material 70 solidifies to lock the cylinder 62 and the sleeve 66 together in a manner that restricts independent torsional rotation about the axis A between the first bar 50 and the second bar 52.

The MR material 70 may be magnetized in any suitable manner. For example and as illustrated in FIG. 2, the coupling assembly 60 includes a first magnet 80, a second magnet 82, and a third magnet 84. Although three magnets are illustrated in the example of FIG. 2, the coupling assembly 60 may include any other suitable number of magnets, such as a single magnet, two magnets, or more than three magnets. In the example of FIG. 2, the first magnet 80 is a coaxial magnet overlapping the MR material 70, as well as an innermost end of the cylinder 62 and the sleeve 66. The second magnet 82 is a coaxial magnet extending around the MR material 70, as well as an outer end of the cylinder 62 and the sleeve 66. The third magnet 84 is a coaxial magnet arranged between the first magnet 80 and the second magnet 82. The third magnet 84 extends around the MR material 70, the cylinder 62, and the sleeve 66.

The magnets 80, 82, and 84 are electromagnetics. Electrical current to the magnets 80, 82, and 84 is controlled by a control module 150. The control module 150 may be mounted at any suitable location about the vehicle 10. The control module 150 is configured to individually control electrical current to each one of the magnets 80, 82, and 84. Thus, the first magnet 80 may be energized without the second magnet 82 and the third magnet 84 being energized. The second magnet 82 may be energized without the first magnet 80 and the third magnet 84 being energized. The first magnet 80 and the third magnet 84 may be simultaneously energized without the second magnet 82 being energized. The magnets 80, 82, and 84 (as well as any combination of additional magnets that may be included) may be energized in any other suitable combination as well.

Stiffness of the front suspension system 12 may be modified by selectively energizing the magnets 80, 82, and 84. For example, if a relatively "soft" suspension is called for, the control module 150 is configured to energize only the first magnet 80, and thus not energize the second magnet 82 or the third magnet 84. By only energizing the first magnet 80, only the portion of the MR material 70 approximate to the first magnet 80 will solidify, and thus only the innermost portion of the cylinder 62 will be locked to the sleeve 66 of the second bar 52. The remaining area of the cylinder 62 and the rest of the first bar 50 will not be locked relative to the second bar 52, and thus may rotate about the axis A independent of rotation of the second bar 52.

To increase the stiffness of the front suspension 12, the control module 150 is configured to energize the third magnet 84 in addition to the first magnet 80. By energizing both the first magnet 80 and the third magnet 84, the middle area of the cylinder 62 about which the third magnet 84 extends is locked to the sleeve 66 of the second bar 52 by the MR material 70. Thus, energizing both the first magnet 80 and the third magnet 84 increases the overall stiffness of the stabilizer bar assembly 30 as compared to when only the first magnet 80 is energized. To further increase the stiffness of the stabilizer bar assembly 30, the control module 150 is configured to energize the second magnet 82. Energizing the second magnet 82 increases the viscosity of, and generally solidifies the portion of the MR material 70 encompassed by the second magnet 82. By locking the first bar 50 to the second bar 52 by way of the MR material 70 within the second magnet 82, the portion of the cylinder 62 inboard of the second magnet 82 is restricted from rotating about the axis A regardless of whether the first magnet and the third magnet 84 are energized. Thus, only areas of the first bar 50 outboard of the second magnet 82 may rotate about the axis of rotation A, resulting in a relatively stiff front suspension system 12. The control module 150 is configured to selectively energize the first, second, or third magnets 80, 82, 84 based on suspension mode settings set by an operator of the vehicle 10, or automatically based on driving conditions. The rear coupling assembly may be configured with a similar multiple magnet configuration, or only a single magnet.

Figure 4:
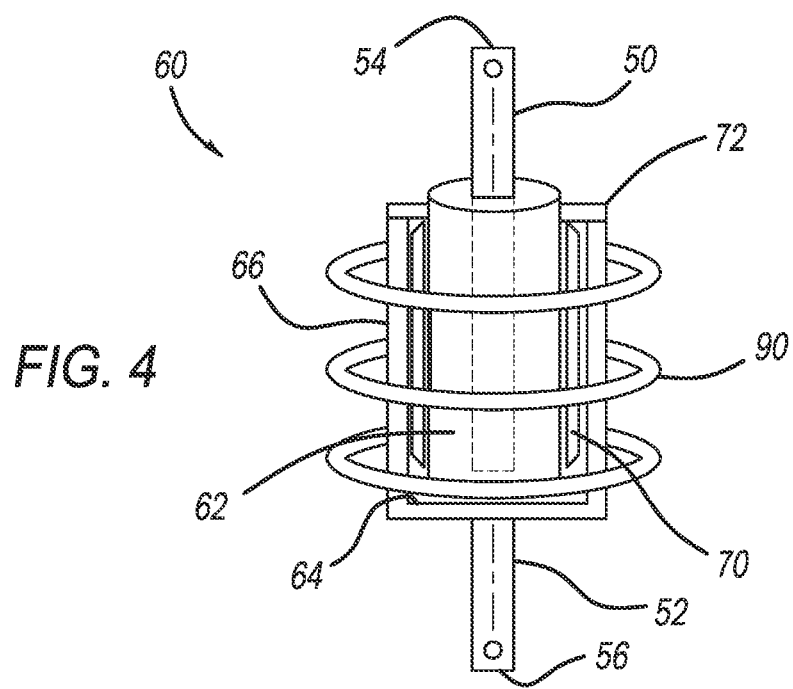
FIG. 4 is a cross-sectional view of a coupling assembly in accordance with the present disclosure for the stabilizer bar assembly of FIG. 3.
Figure 3:
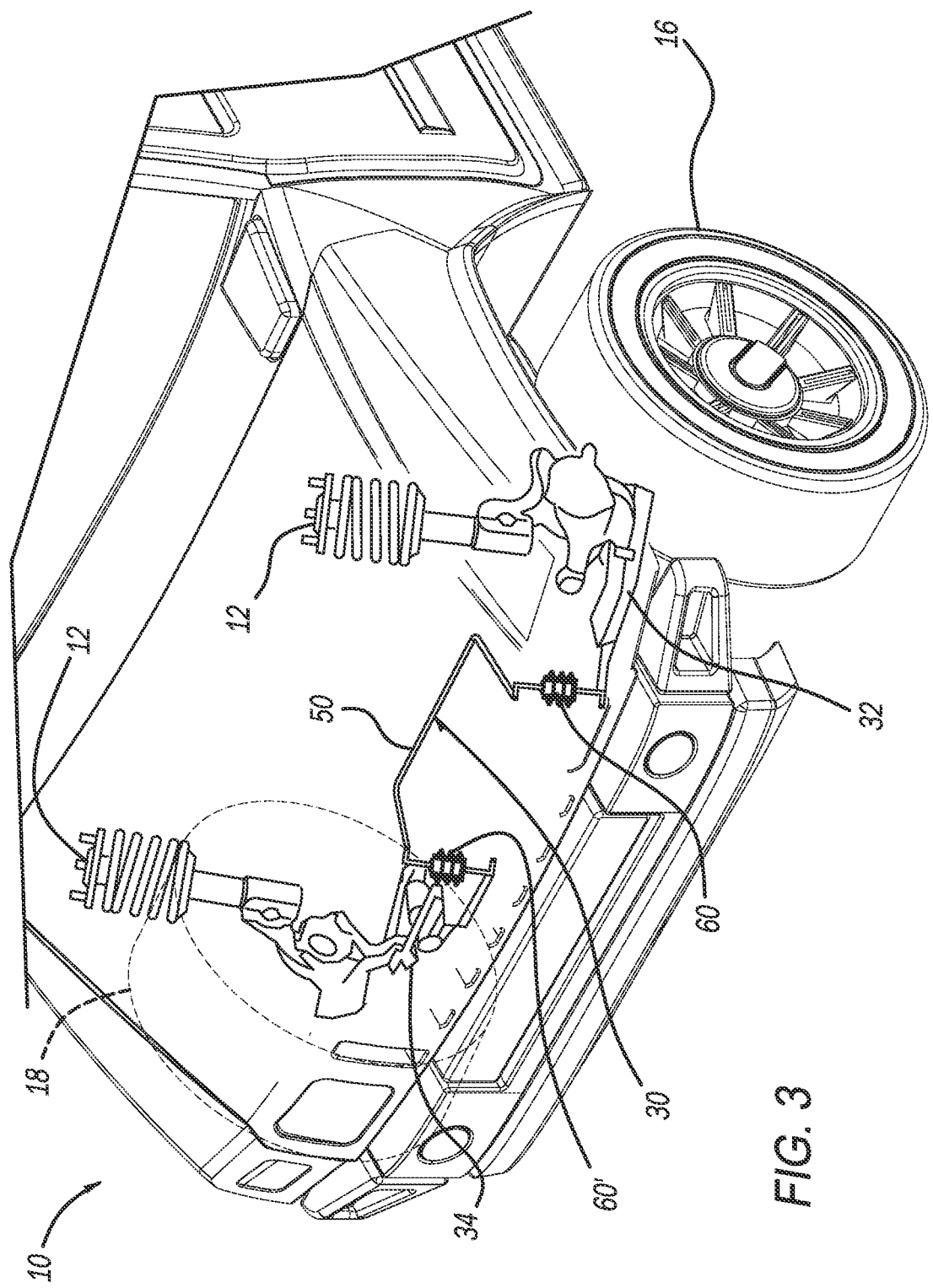
FIG. 3 is a perspective view of the exemplary vehicle including another stabilizer bar assembly in accordance with the present disclosure.

In the example of FIGS. 1 and 2, the coupling assembly 60 is generally a lateral coupling assembly arranged midway between the first front wheel 16 and the second front wheel 18. In accordance with the present disclosure, the coupling assembly 60 may be arranged in any other suitable orientation, and at any other suitable location. For example, and as illustrated in FIGS. 3 and 4, the coupling assembly 60 may be arranged as a linear coupling assembly. A single coupling assembly 60 may be arranged proximate to one of the wheels 16, 18. Alternatively, an additional coupling assembly 60' may be included such that the front suspension system 12 includes two coupling assemblies, 60, 60'. The assembly 60' is the same as, or substantially similar to, the assembly 60 and thus the description of the assembly 60 is also sufficient to describe the assembly 60'. The rear suspension system 14 may include one or two coupling assemblies 60, 60', as well.

When only the single coupling assembly 60 is included, the second bar 52 is connected to one of the control arms 32, 34 (or knuckle, strut, etc.). The first bar 50 extends from the coupling assembly 60 and is mounted to the opposite control arm 32, 34 (or knuckle, strut, etc.). When both the first and the second coupling assemblies 60, 60' are included, the first bar 50 extends from the first coupling assembly 60 to the second coupling assembly 60'. The second bar 52 of one of the coupling assemblies 60 is connected to one of the control arms 32, 34 (or knuckle, strut, etc.); and the second bar 52 of the other one of the coupling assemblies 60' is connected to the other one of the control arms 32, 34 (or knuckle, strut, etc.).

With reference to FIG. 4, the coupling assembly 60 configured as a linear assembly may include a single coaxial magnet 90. Alternatively, the linear coupling assembly 60 may include the first, second, and third magnets 80, 82, 84 illustrated in FIG. 2. With reference to FIG. 5, another magnet configuration in accordance with the present disclosure includes field magnets 92. The field magnets 92 are arranged consecutively about the sleeve 66 such that the individual coils do not wrap around the sleeve 66.

With reference to FIGS. 6A and 6B, the sleeve 66 may include at least one ring 110 extending inward towards or to the cylinder 62. The ring 110 defines a plurality of passageways 112, which are filled with the MR material 70. One or more magnets 114 are included with the ring 110 proximate to the passageways 112. The MR material 70 within and proximate to the passageways 112 will transform from a fluid state to a viscoelastic solid state when subject to a magnetic field to restrict linear movement of the cylinder 62 relative to the sleeve 66. As a result, energizing the magnets 114 increases the stiffness of the stabilizer bar assembly 30.

Figure 7:
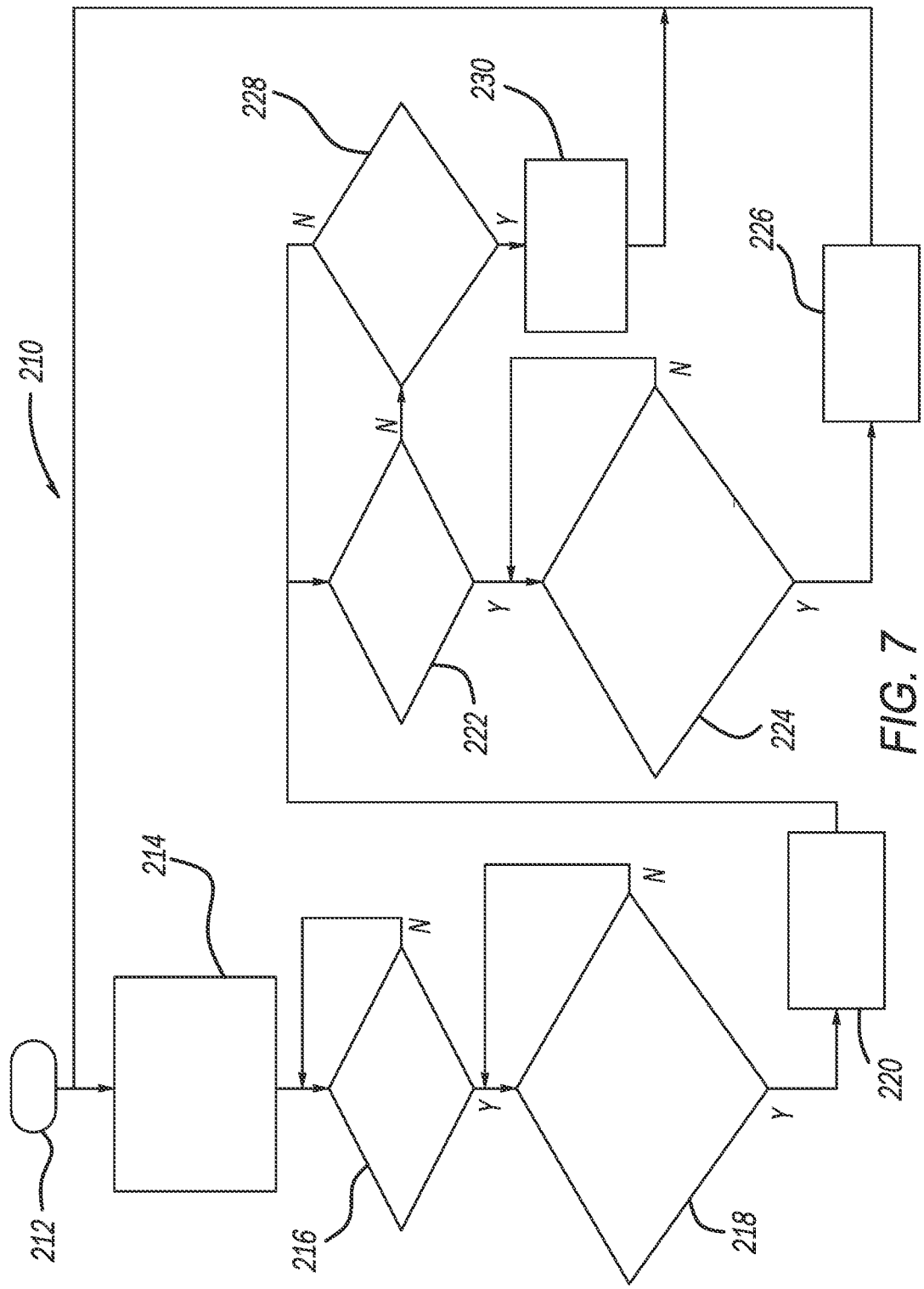
FIG. 7 illustrates exemplary operation of a control module for decoupling and coupling a stabilizer bar assembly in accordance with the present disclosure.

FIG. 7 illustrates an exemplary method 210 for operating the coupling assembly 60 (and the coupling assembly 60' when included) to decouple and couple the stabilizer bar assembly 30. The method 210 may be performed by the control module 150, or by any other suitable control module of the vehicle 10. The method 210 starts at block 212, and at block 214 the control module 150 monitors suspension displacement between the first front wheel 16 and the second front wheel 18. The control module 150 is in receipt of signals from any suitable measuring device configured to measure vertical displacement of the first front wheel 16 relative to the second front wheel 18. The control module 150 also monitors lateral G-forces that the vehicle 10 is subject to, as well as speed of the vehicle 10. The control module 150 is in receipt of signals from any suitable G-force sensor, such as an accelerometer mounted to the vehicle 10. The control module 150 is further in receipt of signals from a speedometer of the vehicle 10.

The control module 150 is in receipt of signals from any suitable user interface by which an operator of the vehicle 10 may input a request for locking or unlocking the coupling assembly 60. Upon receipt of a signal from the interface indicating that the operator entered a request for unlocking the coupling assembly 60 at block 216, the control module 150 checks the parameters monitored at block 214 to determine whether conditions are acceptable for unlocking the coupling assembly 60. Specifically, at block 218, the control module 150 determines whether displacement between the wheels 16, 18 is less than a predetermined limit, whether the measured G-force on the vehicle 10 is less than a predetermined threshold, and whether the speed of the vehicle 10 is less than a predetermined threshold. If any of these measured parameters exceed their predetermined threshold, the control module 150 will not decouple the coupling assembly 60. The control module 150 will continue to monitor the parameters and compare the parameters to their predetermined thresholds at block 218. Once all of the monitored parameters are below their predetermined thresholds, the control module 150 proceeds from block 218 to block 220. At block 220 the control module 150 deactivates the magnets 80, 82, 84, 90, 92, 114 to unlock the coupling assembly 60.

At block 222, the control module 150 monitors signals from the user interface to determine whether an operator of the vehicle 10 has requested that the coupling assembly 60 be locked. Upon receipt of a signal representing a lock request, the control module 150 proceeds to block 224. At block 224 the control module 150 checks the displacement between the wheels 16, 18, the lateral G-force that the vehicle 10 is subject to, and the speed of the vehicle 10 to determine whether or not these parameters are below their predetermined thresholds. At block 224, if the parameters are below their predetermined thresholds, the control module 150 proceeds to block 226. At block 226 the control module 150 energizes one or more of the magnets 80, 82, 84, the magnets 90, 92, or the magnets 114 to lock the coupling assemblies 60. If at block 224 one or more of the monitored parameters are above their predetermined thresholds, the control module 150 will continue to compare the measured parameters to their predetermined thresholds and not proceed to block 226 until all of the parameters are below their predetermined thresholds.

If at block 222 the operator has not requested that the coupling assembly 60 be locked, the method 210 proceeds to block 228. At block 228, the control module 150 checks current driving conditions to determine whether, based on the conditions, the coupling assembly 60 should be activated to couple the first and second bars 50, 52 of the stabilizer bar 30. For example, if the measured speed of the vehicle 10 exceeds a predetermined threshold, the control module 150 will proceed to block 230 to force a ramped recouple in order to reduce vehicle roll at high speeds. Such a ramped recouple procedure includes gradually energizing the magnets 80, 82, 84, 90, 92, or 114 as the displacement between the wheels 16, 18 decreases in order to provide a relatively gentle locking of the coupling assembly 60 that is not excessively noticeable to the operator and occupants of the vehicle 10. The current applied to the magnets 80, 82, 84, 90, 92, 114 is gradually increased until right/left displacement between the wheels 16, 18 is diminished. From blocks 226 and 230, the method 210 returns to block 214 where the control module 150 continues to monitor relevant parameters of the vehicle 10. Although the method 210 describes first decoupling and then coupling the coupling assembly 60, the method 210 may be reversed such that the coupling assembly 60 is first coupled at blocks 226, 230, and then decoupled at block 220.

The control module 150 is further configured to decouple the coupling assembly 60 to minimize impact and wheel hop events, such as when the vehicle 10 hits a pothole or other rough patch of road. For example, the control module 150 is configured to reduce current to the magnets 80, 82, 84, 90, 92, 114 at the moment a high impact event is detected by the suspension 12, 14 to allow the suspension system 12, 14 to soften and absorb the impact. Once the impact has been absorbed, the control module 150 is configured to reenergize the magnets 80, 82, 84, 90, 92, 114 to lock and stiffen the front or rear stabilizer bar assembly 30, 40 to limit any potential wheel hop from occurring.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A stabilizer bar assembly for a suspension system of a vehicle, the stabilizer bar assembly comprising:
   a first bar configured to be coupled to the suspension system proximate to a first wheel;
   a second bar adjacent to the first bar; and
   a coupling assembly at an interface between the first bar and the second bar, the coupling assembly including:
      a magnetorheological material in contact with both the first bar and the second bar, the magnetorheological material configured to transform from a fluid state to a viscoelastic solid state when subject to a magnetic field; and
      a magnet configured to apply the magnetic field to the magnetorheological material, in the viscoelastic solid state the magnetorheological material resists relative movement between the first bar and the second bar.

2. The stabilizer bar assembly of claim 1, wherein the magnetorheological material is sealed within a chamber of the coupling assembly defined between the first bar and the second bar.

3. The stabilizer bar assembly of claim 1, wherein:
   the first bar includes a cylinder, and the second bar defines a receptacle in which the cylinder is seated; and
   the magnetorheological material is between the cylinder and an inner wall of the receptacle.

4. The stabilizer bar assembly of claim 1, wherein the magnet is a field magnet.

5. The stabilizer bar assembly of claim 1, wherein the magnet is a damper restriction magnet.

6. The stabilizer bar assembly of claim 1, wherein the magnet is adjacent a passageway defined by the coupling assembly, the magnetorheological material is seated within the passageway.

7. The stabilizer bar assembly of claim 1, wherein the second bar is configured to be coupled to the suspension system proximate to a second wheel that is opposite to the first wheel.

8. The stabilizer bar assembly of claim 1, wherein:
   the coupling assembly is a first coupling assembly proximate to the first wheel on a first side of the vehicle; and
   a second coupling assembly is proximate to a second wheel on a second side of the vehicle, the second coupling assembly is a magnetorheological fluid coupling assembly configured to resist relative movement between the second bar and a third bar, the third bar configured to be coupled to the suspension system proximate to the second wheel.

9. The stabilizer bar assembly of claim 1, wherein the magnet includes:
   a first coaxial magnet overlapping a distal end of the first bar and overlapping a sleeve of the second bar;
   a second coaxial magnet overlapping a distal end of the sleeve of the second bar and overlapping the first bar; and
   a third coaxial magnet overlapping both the first bar and the sleeve of the second bar, the third coaxial magnet is between the first coaxial magnet and the second coaxial magnet.

10. The stabilizer bar assembly of claim 9, further comprising a control module configured to individually activate the first coaxial magnet, the second coaxial magnet, and the third coaxial magnet.

11. The stabilizer bar assembly of claim 1, further comprising a control module configured to not change an energy state of the magnet when speed of the vehicle is above a predetermined limit.

12. The stabilizer bar assembly of claim 11, wherein the control module is further configured to not change an energy state of the magnet when the vehicle is experiencing a lateral gravitational force that is above a predetermined G-force threshold, and when relative vertical displacement between the first wheel and a second wheel opposite to the first wheel exceeds a predetermined displacement threshold.

13. The stabilizer bar assembly of claim 1, further comprising a control module configured to gradually energize the magnet to gradually apply the magnetic field to the magnetorheological material when speed of the vehicle exceeds a predetermined threshold.

14. The stabilizer bar assembly of claim 1, further comprising a control module configured to monitor a displacement of the first wheel and a second wheel opposite to the first wheel, and reduce the magnetic field of the magnet to decrease viscosity of the magnetorheological material and permit relative movement between the first bar and the second bar in response to the displacement exceeding a predetermined level during an impact event.

15. A stabilizer bar assembly for a suspension system of a vehicle, the stabilizer bar assembly comprising:
   a first bar including a first end configured to be coupled to the suspension system proximate to a first wheel on a first side of the vehicle;
   a second bar defining a sleeve in receipt of a second end of the first bar, the second bar configured to be coupled to the suspension system proximate to a second wheel opposite to the first wheel on a second side of the vehicle; and
   a coupling assembly at an interface between the first bar and the second bar, the coupling assembly including:
      a magnetorheological material in contact with both the first bar and the second bar, the magnetorheological material configured to transform from a fluid state to a viscoelastic solid state when subject to a magnetic field; and
      a magnet configured to apply the magnetic field to the magnetorheological material, in the viscoelastic solid state the magnetorheological material resists relative torsional rotation between the first bar and the second bar.

16. The stabilizer bar assembly of claim 15, wherein the magnet includes:
   a first coaxial magnet overlapping both the second end of the first bar and the sleeve of the second bar;
   a second coaxial magnet overlapping a distal end of the sleeve of the second bar and overlapping the first bar; and
   a third coaxial magnet overlapping both the first bar and the sleeve of the second bar, the third coaxial magnet is between the first coaxial magnet and the second coaxial magnet.

17. The stabilizer bar assembly of claim 16, further comprising a control module configured to individually activate the first coaxial magnet, the second coaxial magnet, and the third coaxial magnet to vary torsional stiffness of the stabilizer bar assembly.

18. A stabilizer bar assembly for a suspension system of a vehicle, the stabilizer bar assembly comprising:
   a bar between a first wheel at a first side of the vehicle and a second wheel at a second side of the vehicle, the bar extending from the first side of the vehicle to the second side of the vehicle; and
   a first coupling assembly mounted adjacent to the first wheel, the first coupling assembly including:
      a sleeve in receipt of the bar;
      a magnetorheological material within the sleeve and in contact with the bar, the magnetorheological material configured to transform from a fluid state to a viscoelastic solid state when subject to a magnetic field; and
      a magnet configured to apply the magnetic field to the magnetorheological material, in the viscoelastic solid state the magnetorheological material resists linear movement of the bar relative to the sleeve.

19. The stabilizer bar assembly of claim 18, wherein the bar extends from the first coupling assembly and is mounted proximate to a control arm of the second wheel.

20. The stabilizer bar assembly of claim 18, further comprising a second coupling assembly mounted adjacent to the second wheel, the second coupling assembly is a magnetorheological coupling assembly in receipt of the bar.

* * * * *